United States Patent
Shimbaru (10) Patent No.: US 7,809,187 B2
(45) Date of Patent: Oct. 5, 2010

(54) COLOR PROCESSING METHOD AND APPARATUS

(75) Inventor: Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1011 days.

(21) Appl. No.: 11/385,592

(22) Filed: Mar. 21, 2006

(65) Prior Publication Data

US 2007/0003136 A1    Jan. 4, 2007

(30) Foreign Application Priority Data

Jun. 30, 2005   (JP) ............................. 2005-192201

(51) Int. Cl.
*G06K 9/00*    (2006.01)
(52) U.S. Cl. .................. 382/162; 382/167; 382/169
(58) Field of Classification Search ............... 382/162, 382/166, 167
See application file for complete search history.

(56) References Cited

U.S. PATENT DOCUMENTS

| | | | | |
|---|---|---|---|---|
| 5,416,890 A | * | 5/1995 | Beretta | ...................... 345/590 |
| 5,982,925 A | * | 11/1999 | Koizumi et al. | ............. 382/166 |
| 6,041,136 A | | 3/2000 | Ohga | |
| 6,111,356 A | * | 8/2000 | Roitman et al. | ............. 313/506 |
| 6,373,595 B1 | * | 4/2002 | Semba et al. | ................ 358/1.9 |
| 6,611,352 B2 | * | 8/2003 | Suzuki et al. | ............... 358/1.18 |
| 7,327,875 B2 | * | 2/2008 | Sawada | ...................... 382/162 |
| 2001/0017627 A1 | * | 8/2001 | Marsden et al. | ............. 345/501 |
| 2002/0163669 A1 | * | 11/2002 | Yamazaki et al. | .......... 358/3.23 |
| 2003/0133138 A1 | * | 7/2003 | Namikata | .................... 358/1.9 |
| 2004/0105581 A1 | * | 6/2004 | Sawada | ...................... 382/162 |
| 2005/0073730 A1 | * | 4/2005 | Huang et al. | ................ 358/518 |
| 2005/0276473 A1 | * | 12/2005 | Um et al. | ..................... 382/167 |

OTHER PUBLICATIONS

Jan Morovic, "To Develop a Universal Gamut Mapping Algorithm", Ph. D. Thesis, University of Derby, Oct. 1998.

* cited by examiner

*Primary Examiner*—Brian Q Le
*Assistant Examiner*—Mekonen Bekele
(74) *Attorney, Agent, or Firm*—Canon U.S.A., Inc. I.P. Division (57) ABSTRACT

A color processing method includes setting a reference color as a reference for mapping, setting a distribution range of mapped points based on a color value of the set reference color, distributing a mapped point corresponding to an input color into the distribution range, and mapping the input color into an output color gamut using the mapped point.

8 Claims, 12 Drawing Sheets

| REPRESENTATIVE COLOR | REPRESENTATIVE COLOR VALUE (Lab) | TARGET COLOR VALUE (Lab) |
|---|---|---|
| PrimaryRed | *,*,* | *,*,* |
| PrimaryGreen | *,*,* | *,*,* |
| PrimaryBlue | *,*,* | *,*,* |
| . | | |
| . | | |
| . | | |
| DarkBlue | *,*,* | *,*,* |

COLOR PROCESSING METHOD AND APPARATUS

BACKGROUND OF THE INVENTION

1. Field of the Invention

The present invention relates to a color processing method and a color processing apparatus, and more particularly to a process of mapping input colors into an output color gamut.

2. Description of the Related Art

With the popularization of personal computers and workstations in recent years, desktop publishing (DTP) and computer-aided design (CAD) are in general and widespread use. Under the circumstances, color reproduction technology becomes significant to perform matching colors expressed on a monitor by a computer with colors reproduced on an output medium. In DTP, for example, a color image process advances in such a work flow as creating, editing, and processing a color image on a monitor, and finally outputting the image using a color printer. Users strongly desire that color images on the monitor are perceptually coincident with the images output from the printer in this work flow.

However, in color reproduction technology, there has been difficulty in having a color image on the monitor perceptually agree with an output image from the printer. This difficulty arises for the following reasons.

On the color monitor, a color image is formed by using phosphors to emit light of specific wavelengths. On the other hand, in the color printer, a color image is formed by using ink or the like to absorb light of specific wavelengths and reflecting remaining light. Because of the difference in producing an image as described, the color reproduction range differs greatly between the color monitor and the color printer. Moreover, even among the color monitors, the color reproduction range differs between a liquid crystal monitor and an electron-gun cathode-ray tube monitor. Again, even in the color printers, the color reproduction range differs due to a difference in paper quality or a difference in ink composition, for example. As has been described, since there is such diversity in the color reproduction capacity, it is impossible to achieve complete colorimetric matching in color between images on the monitor and images from the color printer or between color output images from different printer models or among different-quality paper materials.

Technology for absorbing the difference in color reproduction range and for perceptual agreement in display images among display media of different color reproduction ranges includes gamut mapping technology. This gamut mapping technology is a technology of mapping a given color reproduction range to another color reproduction range in L*a*b* color space or JCH color space, for example. In gamut mapping technology, there are different methods as follows.

(C1) A method of mapping a whole color reproduction range in a linear fashion.

(C2) A method of mapping only colors outside a color reproduction range to the surface of the color reproduction range.

(C3) A method of, while compressing original colors as little as possible in a color reproduction range, compressing colors outside the color reproduction range to a high saturation portion of the color reproduction range with one point on the L axis used as the target point in order to keep gradation (U.S. Pat. No. 6,041,136).

With the method (C1) mentioned above, because the whole input color gamut is mapped, gradation is prevented from being impaired. However, all of the colors, including representative colors, will change.

With the method (C2) mentioned above, it sometimes occurs that two points outside the color reproduction range are mapped at the same position on the outer periphery of the color reproduction range. This causes gradation to be lost and results in a loss of information that an image possesses.

In the method (C3) mentioned above, it sometimes occurs that the representative colors, calculated based on a perceptual correspondence relation between the monitor and the printer, are also mapped. As result, a considerable disagreement arises in the human perception of the representative colors. This problem also exists in the method (C1) mentioned above.

SUMMARY OF THE INVENTION

In an aspect of the present invention, a color processing method includes setting a reference color as a reference for mapping, setting a distribution range of mapped points based on a color value of the set reference color, distributing a mapped point corresponding to an input color into the distribution range, and mapping the input color into an output color gamut using the mapped point.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENT

Exemplary embodiments of the present invention will now be described in detail in accordance with the accompanying drawings.

Figure 1:
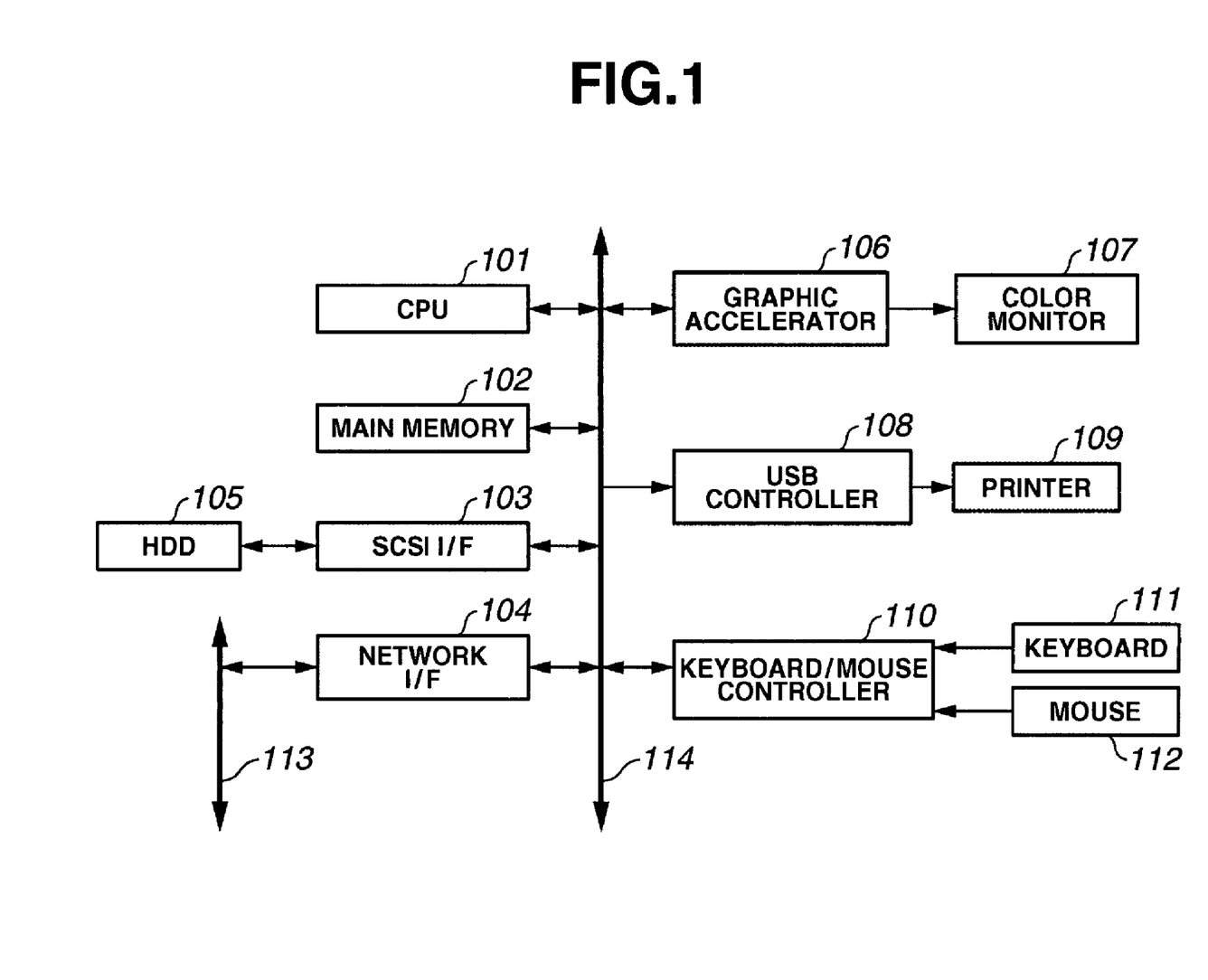
FIG. 1 a block diagram showing a system configuration of a color reproducing and editing apparatus according to a first embodiment of the present invention.

FIG. 1 is a block diagram of a color processing apparatus according to a first exemplary embodiment of the present invention. The color processing apparatus includes a central processing unit (CPU) 101, a main memory 102, a Small Computer System Interface (SCSI interface) 103, and a network interface (I/F) 104. The color processing apparatus further includes a hard disk drive (HDD) 105, a graphic accelerator 106, a color monitor 107, a universal serial bus (USB) controller 108, a color printer 109, and a keyboard/mouse controller 110. The color processing apparatus further includes a keyboard 111 and a mouse 112. The color processing apparatus can communicate with other devices via a network, such as a local area network (LAN) 113. Components in the color processing apparatus communicate with each other via a bus, such as a Peripheral Component Interconnect (PCI) bus 114.

A description will be made of a digital image output operation of the printer 109 in the color processing apparatus. The CPU 101 activates an image application stored in the HDD 105. Then, in response to a command from the user, the CPU 101 transfers digital image data and representative color data according to processing in the image application. In the transfer processing, the CPU 101 issues a command to transfer digital image data and representative color data, stored in the HDD 105, to the main memory 102 through the SCSI I/F 103 and the PCI bus 114. Alternatively, the CPU 101 transfers image data stored in a server connected to the LAN 113 or digital image data on the Internet to the main memory 102 through the network I/F 104 and the PCI bus 114. A description will now be made on the assumption that the digital image data stored in the main memory 102 is image data in which RGB (red-green-blue) signals each are represented by 8 bits without sign. Responsive to a command from the CPU 101, the digital image data stored in the main memory 102 is transferred to the graphic accelerator 106 through the PCI bus 114. The graphic accelerator 106 converts the digital image data into an analog signal and transmits the analog signal to the color monitor 107 via a display cable. Thus, an image is displayed on the color monitor 107. At this point in time, the user can issue a command to instruct the image application to output digital image stored in the main memory 102 from the printer 109. Upon receiving the command, the image application transfers the digital image data and the representative color data to a printer driver. The CPU 101 converts the digital image data into CMYK (Cyan-Magenta-Yellow-Key/black) digital image data according to a flowchart of processing performed by the printer driver (to be described later). After the image data has been converted, the CPU 101 transmits the CMYK image data to the printer 109 through the USB controller 108. As a result of the above-described sequence of operations, the printer 109 prints out a CMYK image.

A description will be made of the printer driver operation in the structure described above with reference to the flowchart of FIG. 2.

Figure 2:
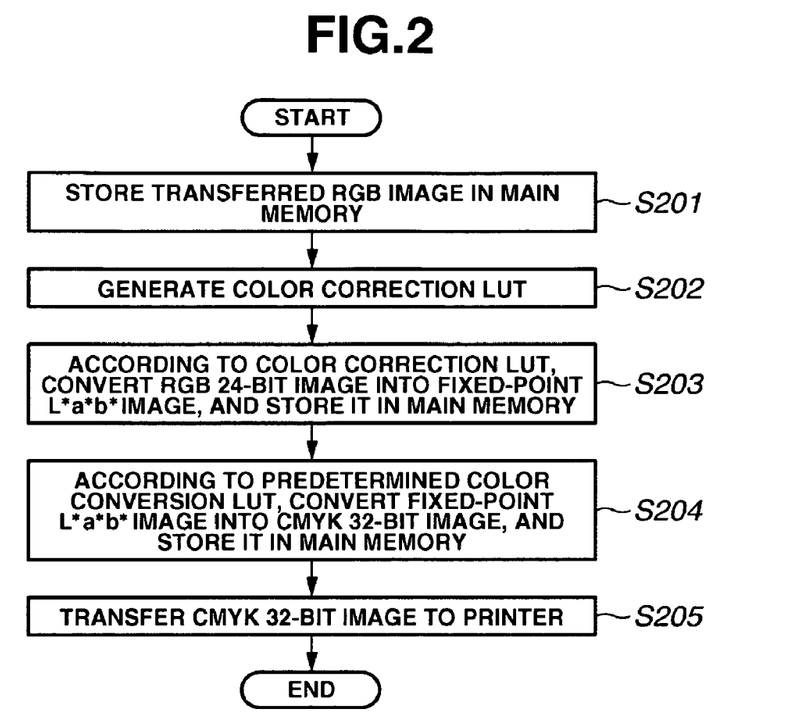
FIG. 2 is a flowchart showing processing performed by a printer driver in the color reproducing and editing apparatus according to the first embodiment of the present invention.

In Step S201, RGB 24-bit image data (each color signal consists of 8-bit image data without sign) transferred from the image application is stored in the main memory 102.

Figure 3:
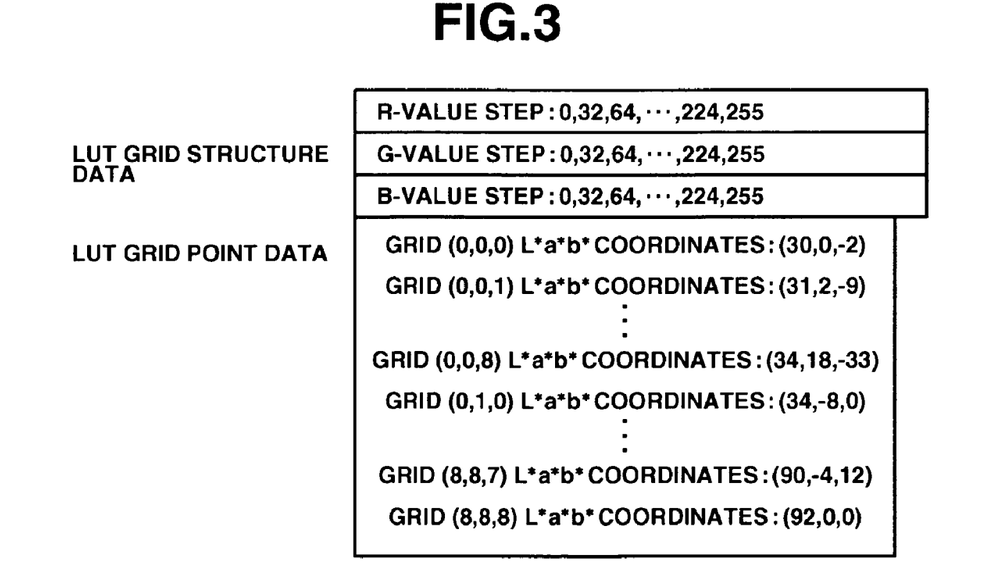
FIG. 3 is a diagram illustrating a data structure of a color correction look-up table (LUT).

In Step S202, a color correction look-up table (LUT) is generated according to processing which will be described later. The color correction LUT is written in a data structure such as that shown in FIG. 3, which indicates the correspondence between the color coordinate values of grid points in RGB color space and the coordinate values of L*a*b* color space. At the top of the data structure, the steps of each of R, G and B values are written. Following those steps, an L* value, an a* value, and a b* value are written corresponding to each grid point set according to the steps of R, G, and B values.

In Step S203, an RGB 24-bit image is converted into L*a*b* fixed-point data according to the color correction LUT, which is then stored in the main memory 102. In Step S204, in accordance with a predetermined color conversion LUT which describes the correspondence between coordinate values of L*a*b* color space and CMYK image data, the above-mentioned L*a*b* fixed-point data is converted into CMYK 32-bit image data (each color signal of CMYK image data consists of 8-bit image data without sign), which is then stored in the main memory 102.

In Step S205, the CMYK 32-bit image data stored in the main memory 102 is transmitted to the printer 109 through the USB controller 108.

Figure 4:
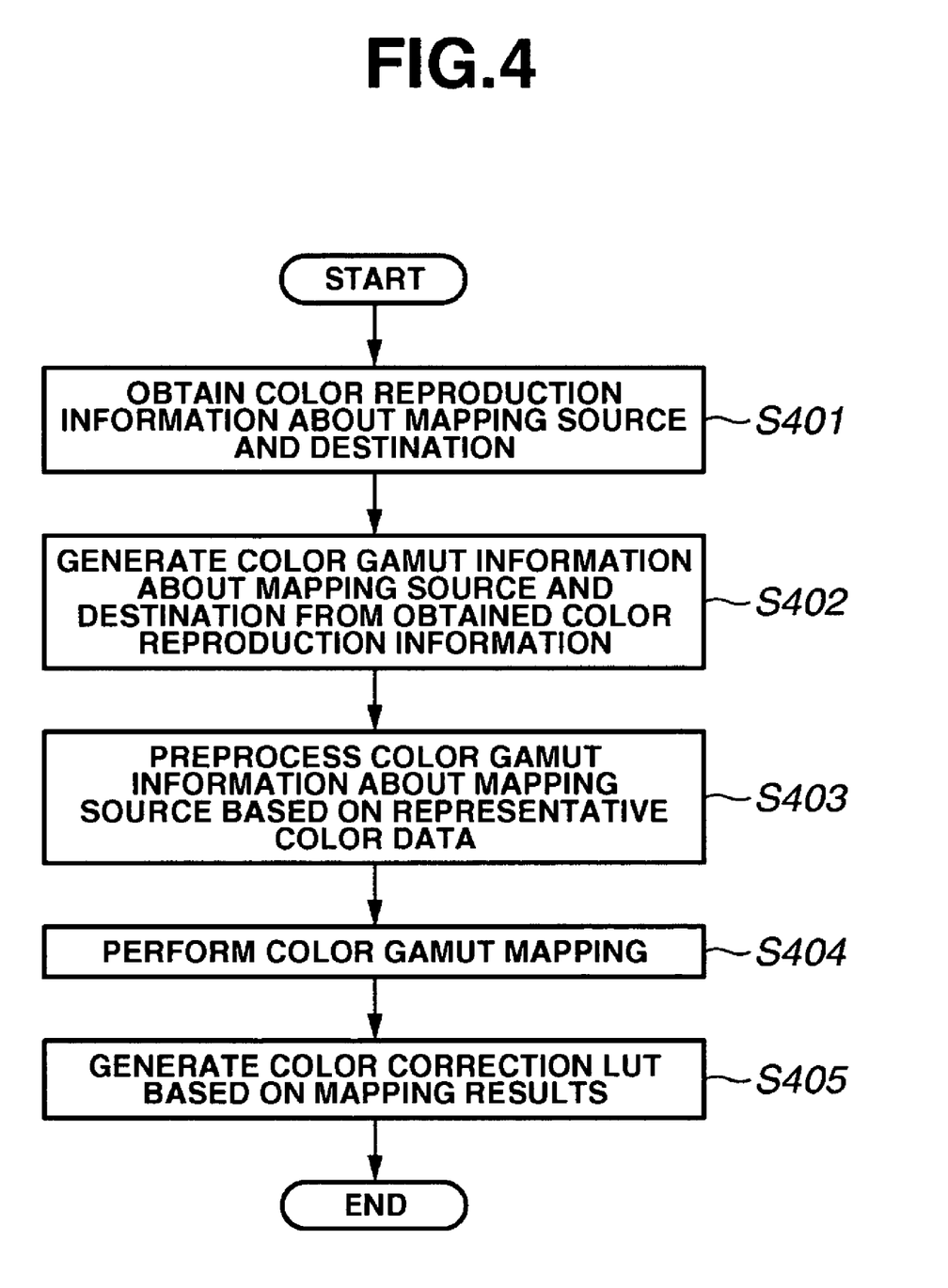
FIG. 4 is a flowchart illustrating processing for generating a color correction LUT.

A description will be made next of a method of generating the color correction LUT in Step S202 with reference to the flowchart of FIG. 4.

In Step S401, color reproduction information about a mapping source (input) and color reproduction information about a mapping destination (output) are obtained. The color reproduction information represents a plurality of pieces of color data included in a color reproduction range. For example, color reproduction information includes conversion equations for converting standard RGB (sRGB) values into L*a*b* values and correspondence data between device RGB values, which shows a color reproduction characteristic of the device, and colorimetric values (L*a*b*).

Figure 5:
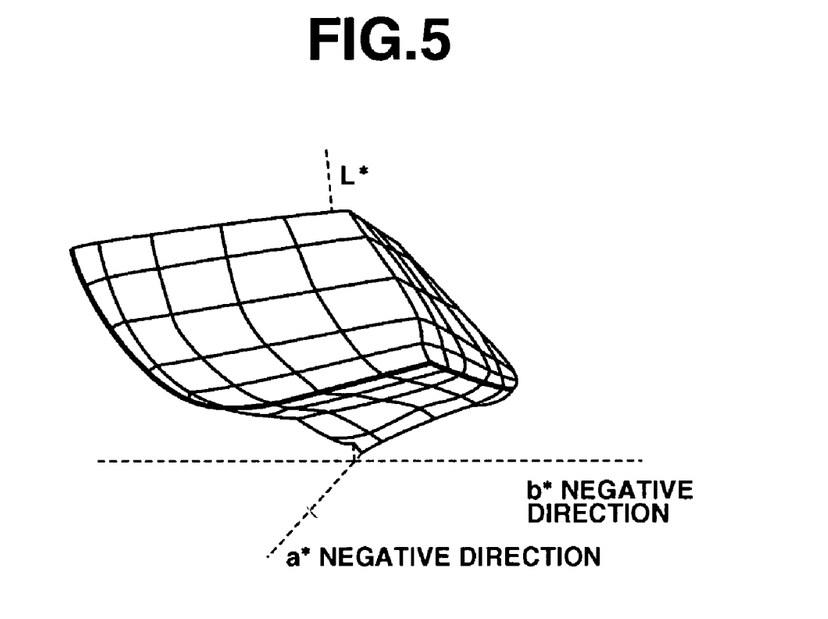
FIG. 5 illustrates an example of color gamut information generated by Convex Hull technology.
Figure 6:
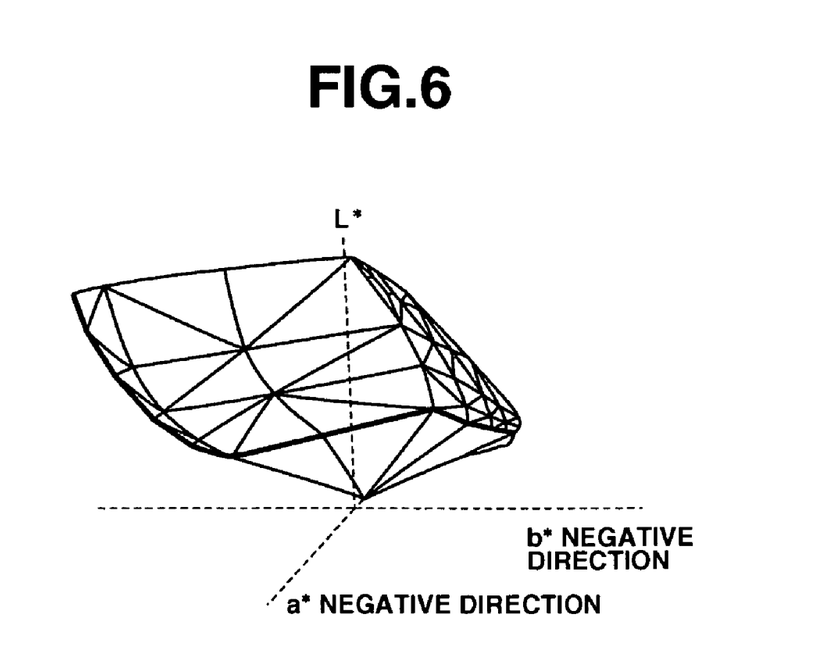
FIG. 6 illustrates another example of color gamut information generated by Convex Hull technology.

In Step S402, from the obtained color reproduction information of the mapping source and color reproduction information of the mapping destination, color gamut information of the mapping source and color gamut information of the mapping destination are generated in L*a*b* color space. Color gamut information indicates the surface of a color reproduction range. Color gamut information in the present embodiment is geometric information about a polygon formed by a combination of a plurality of polygons, generated based on color reproduction information. By way of example, color gamut information is shown in FIGS. 5 and 6. FIG. 5 shows color gamut information in a combination of quadrangles, and FIG. 6 shows color gamut information in a combination of triangles.

In Step S403, a mapping process (pre-processing) is performed according to a method (to be described later). The representative color data transferred from the image application includes not only representative colors but also predetermined target colors serving as targets for the representative colors. In order to match representative colors in the representative color data with target colors, a mapping process (pre-processing) is performed on L*a*b* values in the color reproduction information of the mapping source, which has been obtained in Step S401. The representative colors are colors to be matched with the target colors among colors included in the input colors. For the representative colors, primary colors and secondary colors are used, such as red, green, blue, cyan, magenta, yellow, and so on. If there is another color to be matched with the target color, a representative color other than the primary colors and the secondary colors can be used. Moreover, representative colors can be set according to a command to the image application from the user.

In Step S404, a mapped point distribution range where mapped points can be set is set based on representative colors according to a method which will be described later. After the mapped point distribution range has been set, mapped points are distributed into the mapped point distribution range. Using the distributed mapped points, color gamut mapping is applied to the L*a*b* values preprocessed in Step S403.

In Step S405, using the color reproduction information of the mapping source, a color correction LUT is generated which indicates the correspondence between the color coordinates at the gird points of device RGB color space, or sRGB values, and the L*a*b* values obtained as a result of mapping in Step S404.

Thus, the color correction LUT is generated in Step S202 as described above.

Figure 7:
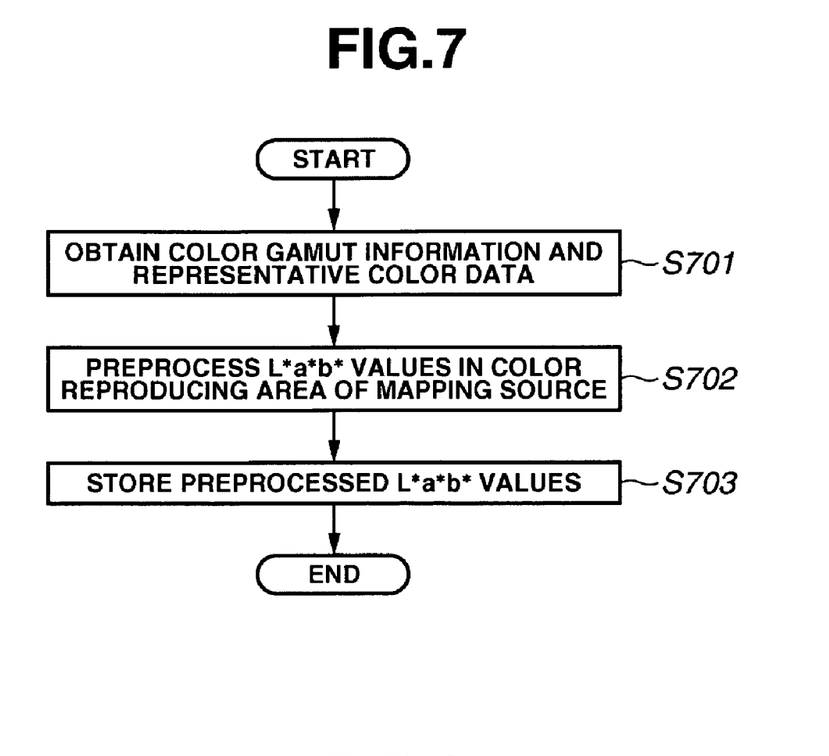
FIG. 7 is a flowchart illustrating preprocessing of color gamut information using representative color data.

Preprocessing using representative colors in Step S403 will be described with reference to the flowchart of FIG. 7.

Figure 8:
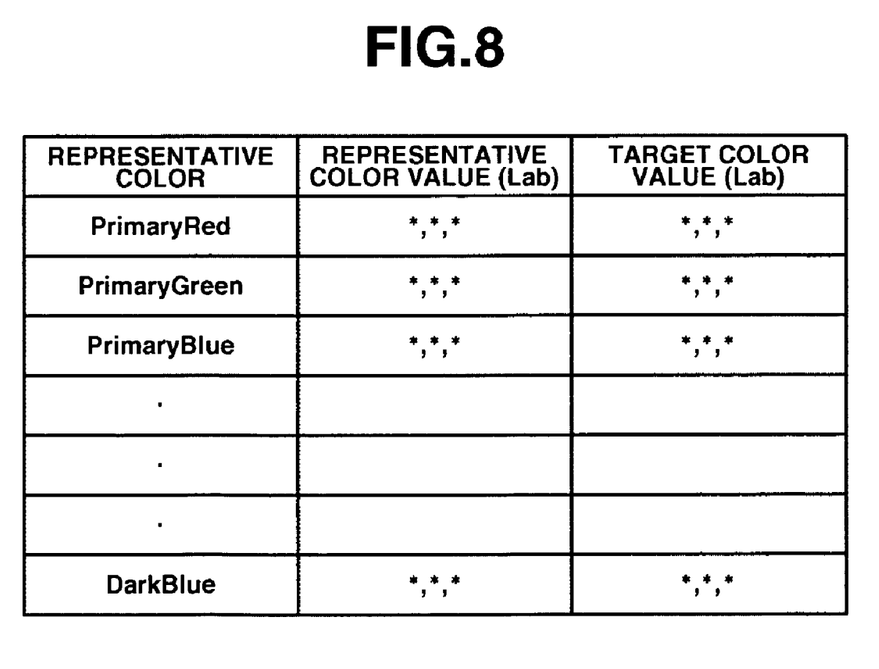
FIG. 8 is a diagram showing representative color data.

In Step S701, color gamut information of the mapping source and the mapping destination, generated in Step S402, and representative color data are obtained. The representative color data, as shown in FIG. 8, is data presenting the correspondence relation between the L*a*b* values of the representative colors and the L*a*b* values of the target colors.

In Step S702, from the representative color data representing the correspondence between the representative colors and the target colors, obtained in Step S701, a rate of change of the L*a*b* values in the color reproduction information of the mapping source, obtained in Step S401, is calculated. After the change rate has been calculated, the L*a*b* values are converted according to the calculated change rate. More specifically, a spline function is calculated which indicates the correspondence between the L*a*b* values of the representative colors and the L*a*b* values of the target colors. After the spline function has been calculated, the L*a*b* values in the color reproduction information of the mapping source, obtained in Step S401, are converted using the calculated spline function.

In Step S703, the L*a*b* values obtained in Step S702 are stored in the main memory 102.

Thus, the preprocessing is performed using representative colors in Step S403 as described above.

Figure 9:
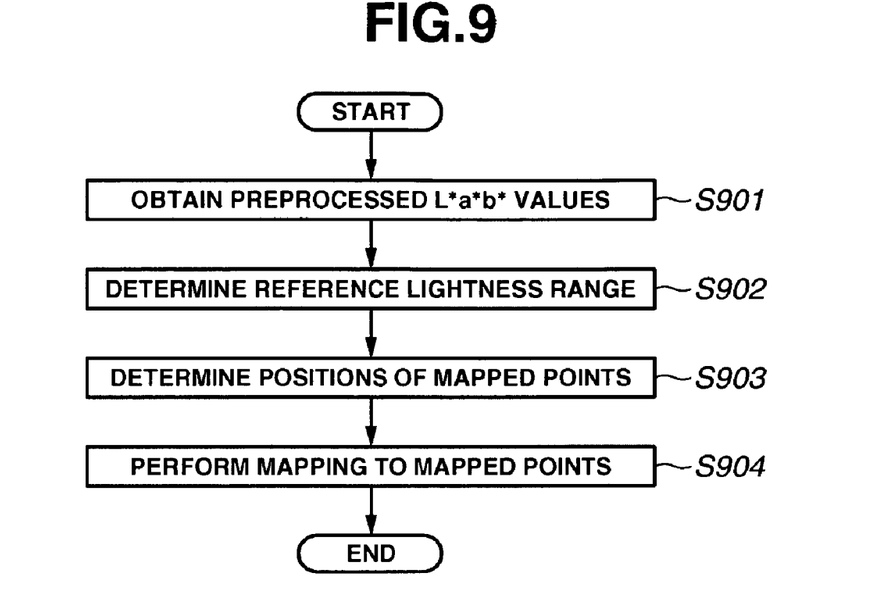
FIG. 9 is a flowchart illustrating color gamut mapping processing based on representative color data.

A description will be made of a color gamut mapping process in Step S404 with reference to the flowchart of FIG. 9.

In Step S901, the L*a*b* values obtained in Step S403 are obtained.

In Step S902, a reference lightness range is set in the above-described mapped point distribution range with reference to a process flow which will be described later. The reference lightness range is a range where the obtained L*a*b* values are subjected to uniform-lightness compression to prevent any changes from arising according to the human visual perception. If the lightness in the obtained L*a*b* values is within the reference lightness range, the mapped points are set in a direction of mapping with the lightness component and the hue component kept constant.

In Step S903, a mapped point distribution range, where the mapped points can be distributed according to the reference lightness range determined in Step S902, is set according to a method which will be described later. Then, the positions of the mapped points are determined according to a process flow which will be described later.

The upper limit value of the mapped point distribution range is made larger than the upper limit value of the reference lightness range and is made smaller than the upper limit value of the lightness of the color gamut of the mapping destination. The lower limit value of the mapped point distribution range is made smaller than the lower limit value of the reference lightness range and is made larger than the lower limit value of the lightness of the color gamut of the mapping destination.

In Step S904, using the mapped points set in Step S903, the lightness and the saturation are mapped while keeping hue values.

Figure 14:
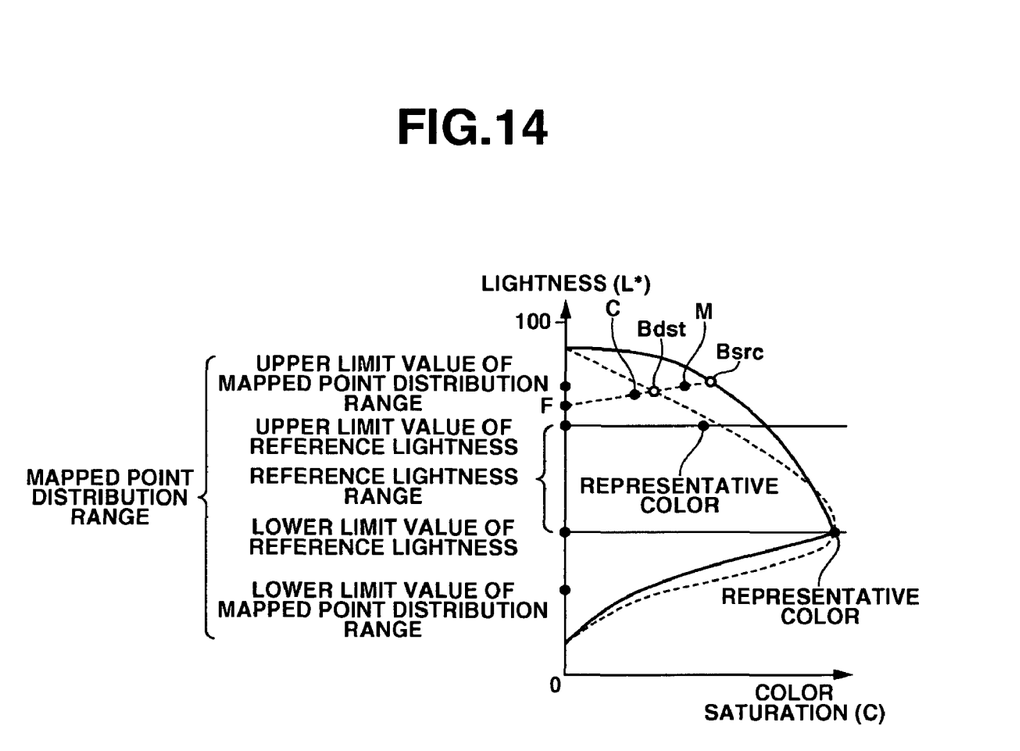
FIG. 14 is a diagram illustrating an algorithm for color gamut mapping in the first embodiment.

The above-mentioned mapping will be described with reference to FIG. 14. In FIG. 14, the solid line denotes the color gamut of the L*a*b* values obtained in Step S403, and the broken line denotes the color gamut of the mapping destination. A mapped point corresponding to a color M indicating the L*a*b* values obtained in Step S403 is denoted as F. Then, an intersection Bsrc between a line connecting points F and M and the color gamut of the L*a*b* values obtained in Step S403 is calculated, and an intersection Bdst between the line connecting points F and M and the color gamut of the mapping destination is calculated. Then, a point C is calculated at which the distance between points Bdst and F is internally divided at a ratio of 1 to 9. This internal division ratio can be changed according to the color gamut shape, etc. If the distance between points M and F is shorter than the distance between points C and F, mapping is not performed on the color M. On the other hand, if the distance between points M and F is longer, a point which divides the distance between points Bdst and C at a ratio at which the point M internally divides the distance between points Bsrc and C is set as a mapped point of the color M. Thus, the mapping process in Step S904 is performed as described above.

Figure 10:
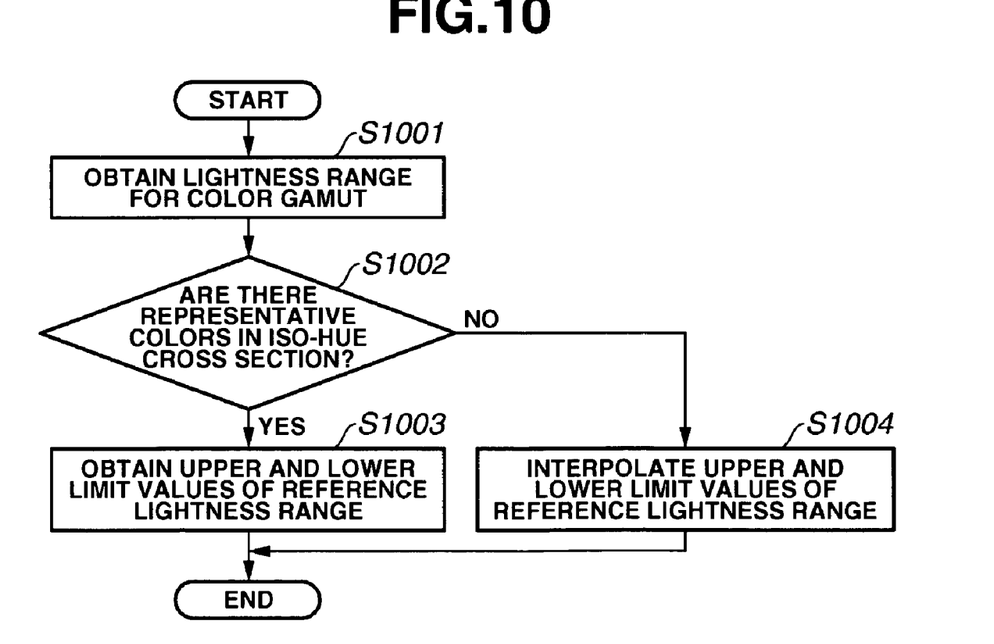
FIG. 10 is a flowchart illustrating processing for determining a reference lightness range when representative colors exist in an iso-hue cross section.

Referring to the flowchart of FIG. 10, a description will be made of a method of determining a reference lightness range in the hue of the obtained L*a*b* values.

In Step S1001, a maximum lightness value and a minimum lightness value are obtained for a color gamut of the obtained L*a*b* values and also for a color gamut of the mapping destination.

In Step S1002, it is determined whether there are representative colors in the iso-hue cross section in the hue of the obtained L*a*b* values. If it is determined that there are representative colors, processing proceeds to Step S1003. If it is determined that there are no representative colors, processing proceeds to Step S1004.

In Step S1003, a search is made for a maximum lightness value and a minimum lightness value in representative colors in the hue of the obtained L*a*b* values. Then, the maximum lightness value in the representative colors is set as the upper limit value of the reference lightness range. The minimum lightness value in the representative colors is set as the lower limit value of the reference lightness range. Thus, a range between the upper limit value and the lower limit value is set as the reference lightness range. If there is only one representative color in the iso-hue cross section of the hue of the obtained L*a*b* values, the upper limit value and the lower limit value of the reference lightness range are set to be the same lightness value.

In Step S1004, the reference lightness range in the hue of the obtained L*a*b* values is calculated by performing an interpolation process which will be described below.

Referring to the flowchart of FIG. 11, a description will be made of a method for determining the reference lightness range when there are no representative colors in the iso-hue cross section in the hue of the obtained L*a*b* values in Step S1004.

In Step S1101, a search is made for an iso-hue cross section where there is a representative color having the closest hue in each of the forward and reverse directions of the hue with respect to the hue of the obtained L*a*b* values.

In Step S1102, a reference lightness range of the iso-hue cross section where there is a representative color found in Step S1101 is calculated and stored.

In Step S1103, interpolation is performed on the reference lightness range in the hue of the obtained L*a*b* values using the reference lightness range of the closest iso-hue cross section in each of the forward and reverse directions. At this time, three cases are conceivable. The first is a case (A1) where there is only one representative color in the iso-hue cross section in either of the forward and reverse directions. The second is a case (A2) where there is one representative color in one of the forward and reverse directions and there are two or more representative colors in the other direction. The third is a case (A3) where there are two or more representative colors in the iso-hue cross section both in the forward and reverse directions.

(A1) A case where there is only one representative color in the iso-hue cross section in either of the forward and reverse directions. In this case, as shown in a hue-lightness diagram of FIG. 12A, a point at which a straight line connecting the reference lightness values in the forward and reverse directions intersects with an iso-hue line of the hue of the obtained L*a*b* values is taken as the reference lightness.

Figure 12A:
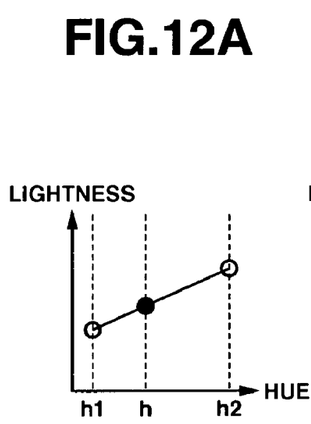
FIGS. 12A, 12B and 12C are diagrams illustrating reference lightness and processing for interpolating a reference lightness range with respect to a hue in which representative colors do not exist.

In FIG. 12A, h denotes the hue of a color to be mapped, h1 denotes the hue of a representative color when there is one representative color in the reverse direction, and h2 denotes the hue of a representative color when there is one representative color in the forward direction. White (unfilled) circles on the hues h1 and h2 indicate reference lightness vales in the respective hues. A black (unfilled) circle on the hue h indicates an interpolated reference lightness value in the hue of the obtained L*a*b* values.

(A2) A case where there is one representative color in the iso-hue cross section in one of the forward and reverse directions and there are two or more representative colors in the other direction. In this case, as shown in the hue-lightness diagram of FIG. 12B, a reference lightness range in the hue of the obtained L*a*b* values is obtained. First, a point is obtained at which a straight line connecting the upper limit value of the reference lightness range in the hue having two or more representative colors and the reference lightness value in the hue having only one representative color intersects with an iso-hue line of the hue of the obtained L*a*b* values. The obtained point is taken as the upper limit value of the reference lightness range in the hue of a color to be mapped. Next, a point is obtained at which a straight line connecting the lower limit value of the reference lightness range in the hue having two or more representative colors and the reference lightness value in the hue having only one representative color intersects with the iso-hue line of the hue of the obtained L*a*b* values. The obtained point is taken as the lower limit value of the reference lightness range in the hue of the obtained L*a*b* values.

Figure 12B:
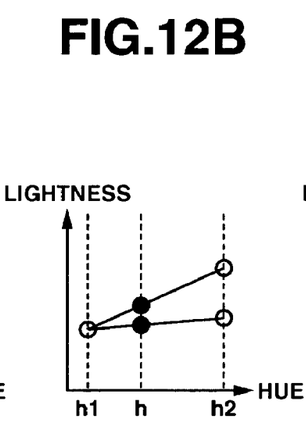

In FIG. 12B, h denotes the hue of a color to be mapped, h1 denotes the hue of a representative color when there is one representative color in the reverse direction, and h2 denotes the hue having two or more representative colors in the forward direction. White (unfilled) circles on the hues h1 and h2 denote reference lightness values in the respective hues, or the upper limit value and the lower limit value of the reference lightness range. Black (filled) circles on the hue h denote the upper limit value and the lower limit value of the interpolated reference lightness range in the hue of a color to be mapped.

(A3) A case where there are two or more representative colors in the iso-hue cross section both in the forward and reverse directions. In this case, as shown in the hue-lightness diagram of FIG. 12C, a reference lightness range in the hue of a color to be mapped is obtained. First, a point is obtained at which a straight line connecting the upper limit value of the reference lightness range in the hue in the reverse direction and the upper limit value of the reference lightness range of the hue in the forward direction intersects with an iso-hue line of the hue of the obtained L*a*b* values. The obtained point is taken as the upper limit value of the reference lightness range in the hue of the obtained L*a*b* values. Then, a point is obtained at which a straight line connecting the lower limit value of the reference lightness range in the hue in the reverse direction and the lower limit value of the reference lightness range in the hue in the forward direction intersects with the iso-hue line in the hue of the obtained L*a*b* values. The obtained point is taken as the lower limit value of the reference lightness range in the hue of the obtained L*a*b* values.

Figure 12C:
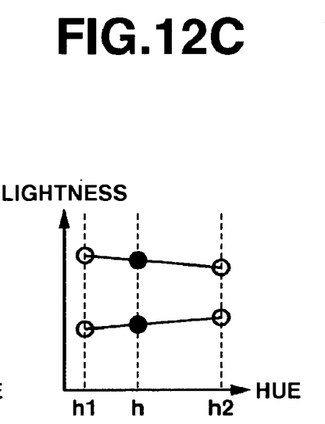

In FIG. 12C, h denotes the hue of the obtained L*a*b* values, h1 denotes the hue of representative colors when there are two or more representative colors, and h2 denotes the hue of representative colors when there are two or more representative colors in the forward direction. White (unfilled) circles on the hues h1 and h2 denote the upper limit value and the lower limit value of the reference lightness range in each of the hues. Black (filled) circles on the hue h denote the upper limit value and the lower limit value of an interpolated reference lightness range in the hue of the obtained L*a*b* values.

Figure 11:
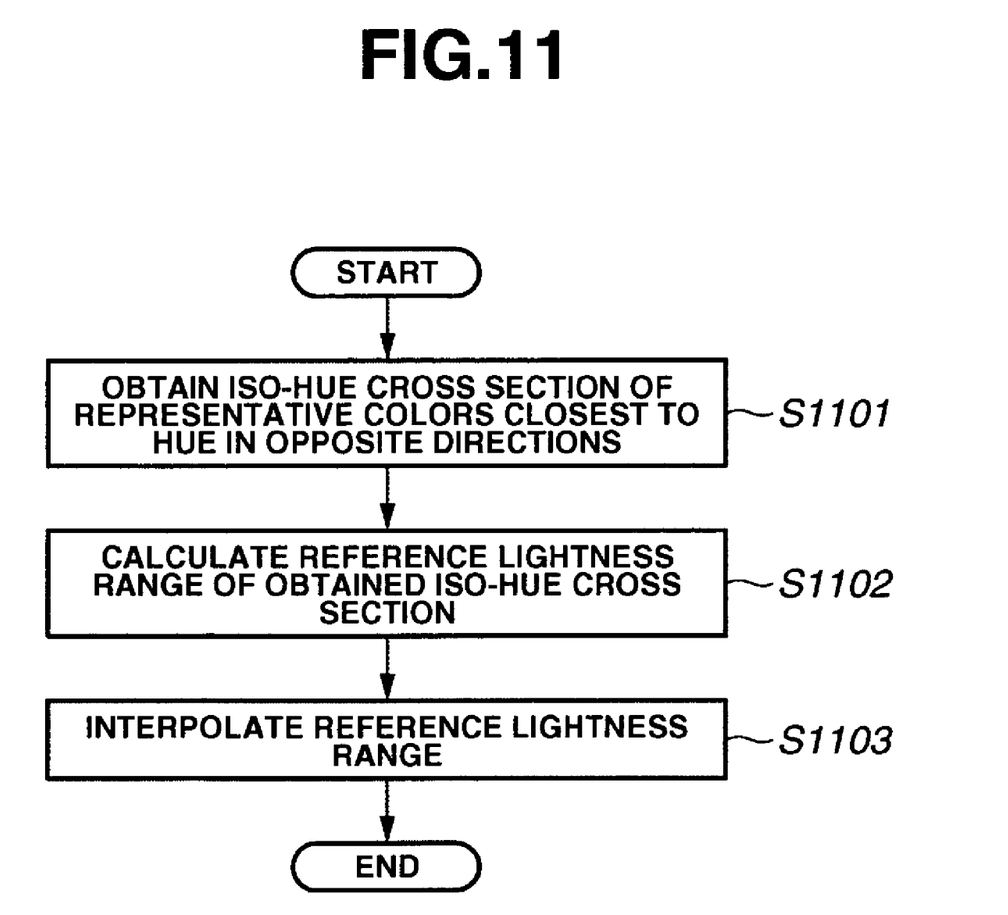
FIG. 11 is a flowchart illustrating processing for interpolating upper and lower limit values of a reference lightness range when representative colors do not exist in the iso-hue cross section.

The above-described interpolation method shown in FIG. 11 facilitates easily determining a reference lightness range even when there are no representative colors in the hue of obtained L*a*b* values.

Figure 13:
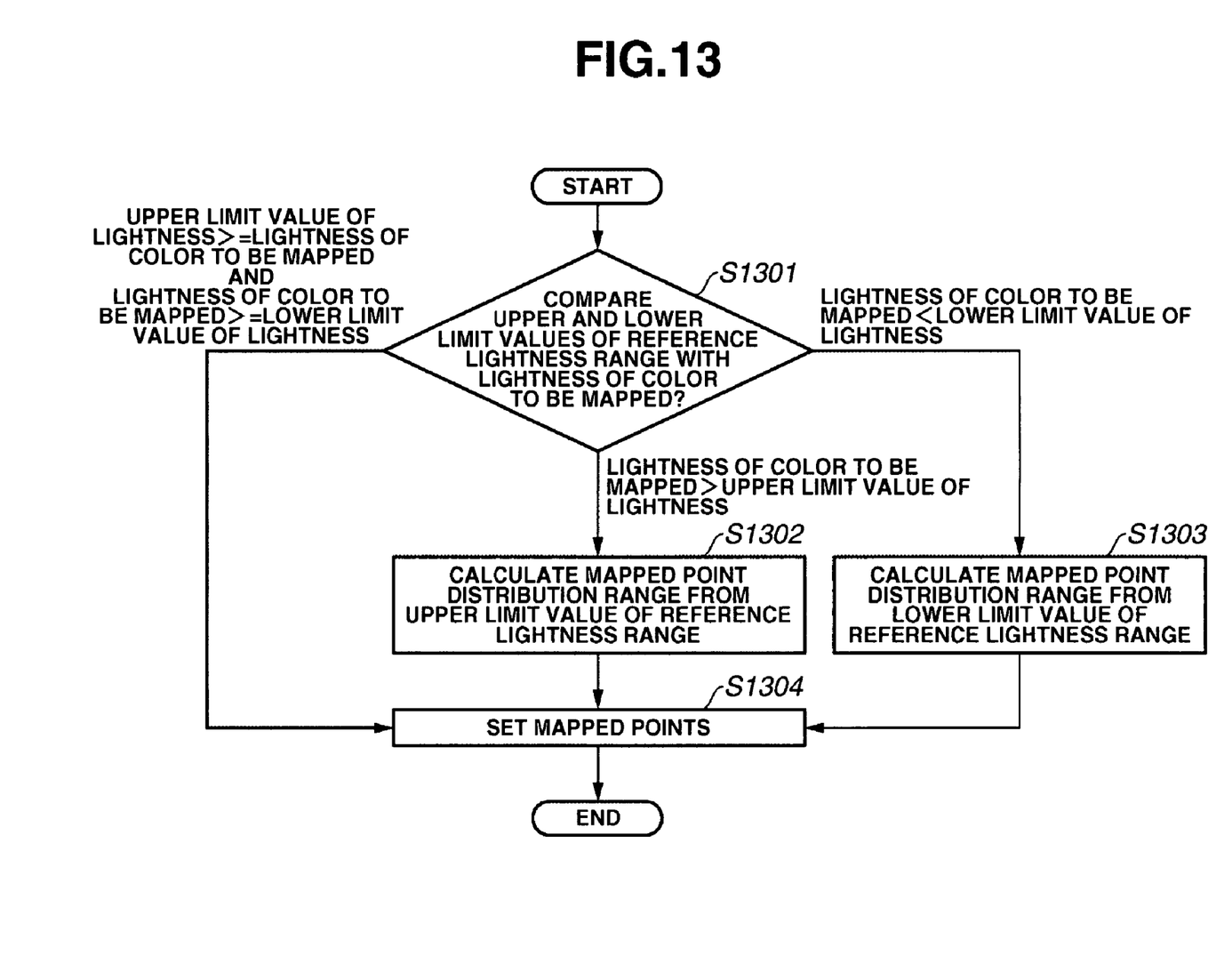
FIG. 13 is a flowchart illustrating processing for determining a mapped point.

Referring to the flowchart of FIG. 13, a description will be made of a method of determining a mapped point distribution range and determining the positions of mapped points in Step S903.

In Step S1301, the upper limit value and the lower limit value of the reference lightness range in the hue of the obtained L*a*b* values are compared with the lightness of a color to be mapped. A description will now be made by referring to three cases as follows: The first is a case (B1) where it is determined that the lightness of the obtained L*a*b* values is higher than the upper limit value of the reference lightness range. The second is a case (B2) where it is determined that the lightness of the obtained L*a*b* values is lower than the lower limit value of the reference lightness range. The third is a case (B3) where it is determined that the lightness of the obtained L*a*b* values is not higher than the upper limit value of the reference lightness range and not lower than the lower limit value of the reference lightness range.

In the case (B1) where it is determined that the lightness of the obtained L*a*b* values is higher than the upper limit value of the reference lightness range, processing proceeds to Step S1302. In Step S1302, a mapped point distribution range, where mapped points can be distributed, is determined, using Equation (1) shown below, from the upper limit value of the reference lightness range and the maximum lightness of a mapping destination color gamut.

$$L_{lim} = L_{base} + (L_{max} - L_{base})^2/100 \quad (1)$$

where $L_{lim}$ is the upper limit value of the mapped point distribution range where mapped points can be distributed, $L_{base}$ is the upper limit value of the reference lightness range, and $L_{max}$ is the maximum lightness of the mapping destination color gamut. After the upper limit value for setting mapped points is determined, processing proceeds to Step S1304.

In the case (B2) where it is determined that the lightness of the obtained L*a*b* values is lower than the lower limit value of the reference lightness range, processing proceeds to Step S1303. In Step S1303, a mapped point distribution range, where mapped points can be distributed, is determined, using Equation (2) shown below, from the lower limit value of the reference lightness range and the minimum lightness of a mapping destination color gamut.

$$L_{lim} = L_{base} - (L_{base} - L_{min})^2 / 100 \quad (2)$$

where $L_{lim}$ is the lower limit value of the mapped point distribution range where mapped points can be distributed, $L_{base}$ is the lower limit value of the reference lightness range, and $L_{min}$ is the minimum lightness of the mapping destination color gamut. After the lower limit value for distributing mapped points is determined, processing proceeds to Step S1304.

In the case (B3) where it is determined that the lightness of the obtained L*a*b* values is not higher than the upper limit value of the reference lightness range and not lower than the lower limit value of the reference lightness range, in order to compress the obtained L*a*b* values with the lightness kept constant, processing proceeds to Step S1304 without determining a range where mapped points can be distributed.

In Step S1304, mapped points are set, which will be described in three cases as follows.

In the case (B1), a ratio is calculated at which the lightness of the obtained L*a*b* values internally divides the range between the upper limit value of the reference lightness range and the maximum lightness of a color gamut of the obtained L*a*b* values. A point is calculated at which the distance between the upper limit value of the reference lightness range and the upper limit value of the mapped point distribution range where mapped points can be distributed is divided at the same ratio as the above calculated ratio. A mapped point is distributed to the position of the calculated point.

In the case (B2), a ratio is calculated at which the lightness of the obtained L*a*b* values internally divides the range between the lower limit value of the reference lightness range and the minimum lightness of a color gamut of the obtained L*a*b* values. A point is calculated at which the distance between the lower limit value of the reference lightness range and the lower limit value of the mapped point distribution range where mapped points can be distributed is divided at the same ratio as the above calculated ratio. A mapped point is distributed to the position of the calculated point.

In the case (B3), as described above, in order to compress the obtained L*a*b* values with the lightness kept constant, a mapped point is distributed to a point on the lightness axis with the lightness equal to that of the obtained L*a*b* values.

As has been described, according to the present embodiment, a mapped point distribution range where mapped points can be distributed is determined according to the reference lightness range.

According to the present embodiment, a method of distributing mapped points differs between the inside of the reference lightness range, including significant representative colors, and the outside of the reference lightness range.

In the inside of the reference lightness range, mapped points are distributed such that colors to be mapped are mapped with the lightness kept constant. By distributing the mapped points such that they can be mapped with the lightness kept constant, mapping can be performed in such a manner that the colors before mapping are perceptually coincident with the colors after mapping.

On the other hand, in the outside of the reference lightness range, a distribution range where mapped points are distributed are set according to the relation between the reference lightness range and the lightness range of a color gamut of the mapping destination. The upper limit value of the distribution range is set to be smaller the maximum lightness of the color gamut of the mapping destination and larger than the upper limit value of the reference lightness range.

Figure 15:
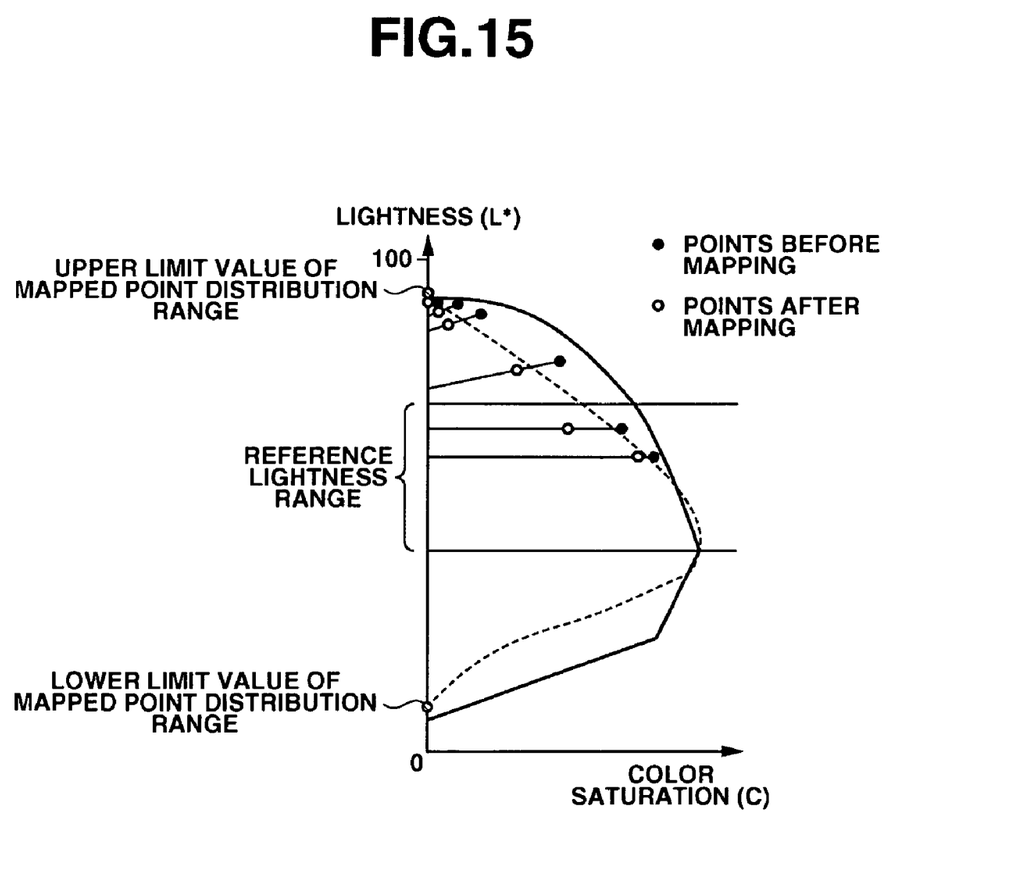
FIG. 15 is a diagram illustrating mapping when a mapped point distribution range coincides with a lightness range of mapping destination points.
Figure 16:
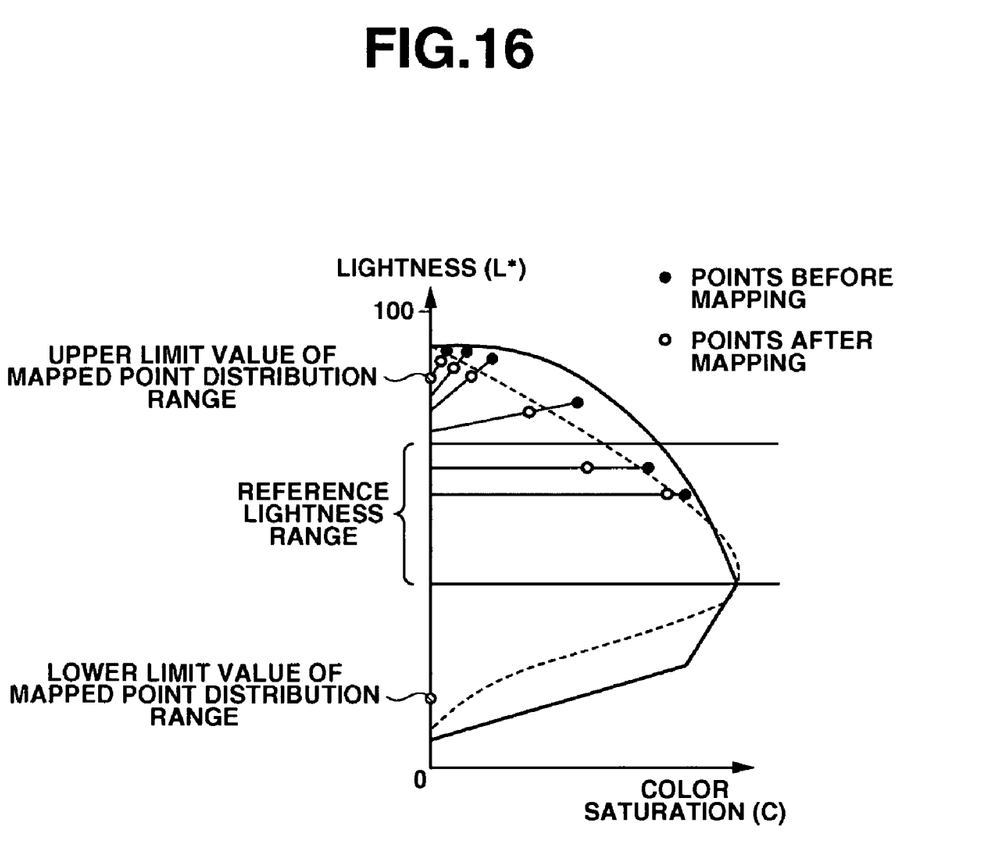
FIG. 16 is a diagram showing mapping in the first embodiment.

FIG. 16 illustrates mapping when the mapped points are distributed within the distribution range set as described. FIG. 15 illustrates mapping when the maximum lightness of the mapping destination is the same as the upper limit value of the distribution range. In FIG. 15, since the points after mapping at high lightness are so close to each other, the color gradation after mapping at high lightness becomes lost. In FIG. 16, however, since the points after mapping are not close to each other compared with the points after mapping shown in FIG. 15, the color gradation after mapping is not lost. In other words, by setting the mapped points according to the method of the present embodiment, the loss of color gradation after mapping at high lightness can be reduced.

Further, the lower limit value of the distribution range is set to be larger than the minimum lightness of the color gamut of the mapping destination and smaller than the lower limit value of the reference lightness range. By setting the mapped points as described above, the loss of color gradation after mapping at low lightness can be reduced as in the high-lightness area.

By setting the mapped points in the manner described above, significant representative colors can be reproduced with high accuracy, and a deterioration of the gradation in both the high-lightness area and the low-lightness area can be reduced.

MODIFICATIONS OF THE EMBODIMENT

In the first embodiment, color-gamut mapping is performed in L*a*b* color space. However, for example, color-gamut mapping can be carried out in other color spaces, such as L*u*v* color space, Lch color space, and Jch space.

Further, in the first embodiment, after preprocessing is performed on input L*a*b* values, the preprocessed input colors are mapped. However, without performing preprocessing, input colors in a color gamut of the mapping source can be mapped. Alternatively, preprocessed L*a*b* values can be obtained in advance so that mapping is performed without preprocessing the L*a*b* values.

A preprocessing method different from the method described in the first embodiment can be performed.

In the first embodiment, a mapped point distribution range is set using the above Equations (1) and (2). However, for example, a range from the median of the reference lightness range to a predetermined lightness value can be set as a mapped point distribution range.

In the first embodiment, when there were no representative colors in the iso-hue cross section in the hue of a color to be mapped, a reference lightness range of the hue having no representative color is set using the interpolation methods illustrated in FIGS. 12A, 12B, and 12C. However, for example, by using a non-linear function, such as a spline function, a reference lightness range of the hue having no representative color can be interpolated and set.

In the first embodiment, mapped points are set on the lightness axis during mapping. However, for example, mapped points can be set on the achromatic line in the output area.

In the first embodiment, mapping is performed with the hue and the lightness kept constant to prevent colors in the reference lightness range or representative colors from changing in the human visual perception. However, mapping can be performed in the direction of hue while avoiding a perceptual color change.

In the first embodiment, image data is represented in RGB 24-bit format or CMYK 32-bit format. However, image data can be represented in RGB 48-bit format or CMYK 64-bit format, for example.

Furthermore, a color processing method according to the first embodiment can be implemented by reading with a computer a recording medium storing thereon a program to realize the color processing method of the first embodiment, and executing the program which is read out.

In the first embodiment, a range where mapped points can be distributed is set according to the lightness of representative colors. However, the range where mapped points can be distributed can be set using color values, such as a saturation value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-192201 filed Jun. 30 , 2005, which is hereby incorporated by reference herein in its entirety.

What is claimed is:

1. A color processing method, performed by a color processing apparatus including a processing unit, for mapping one or more input colors in a first color gamut into a second color gamut, the color processing method comprising:

determining, by the processing unit, representative colors based on the input color;

setting, by the processing unit, a reference lightness range based on lightness of the determined representative colors and a hue of the input color in the first color gamut;

setting, by the processing unit, a first distribution range for a mapped point based on maximum lightness of the second color gamut and an upper point of the reference lightness range, a second distribution range for the mapped point based on the reference lightness range, and a third distribution range for the mapped point based on minimum lightness of the second color gamut and a lower point of the reference lightness range;

setting, by the processing unit the mapped point based on the lightness of the input color and each of the set distribution ranges; and mapping, by the processing unit, the input color into the second color gamut using a line connecting the mapped point and the input color, wherein, when the lightness of the input color is higher than the upper point, the mapped point is distributed in the first distribution range, when the lightness of the input color is inside the reference lightness range, the mapped point is distributed in the second distribution range such that the input color to be mapped is distributed in the second distribution range such that the input color to be mapped is mapped with lightness kept constant, and when the lightness of the input color is lower than the lower point, the mapped point is distributed in the third distribution range.

2. The color processing method according to claim 1, further comprising:

obtaining a correspondence relationship between the one or more representative colors and one or more reference colors in the first color gamut; and performing a conversion of converting the first color gamut such that the one or more representative colors are converted into the one or more reference colors, wherein mapping the input colors into the second color gamut includes mapping the input colors subjected to the conversion using the mapped point.

3. The color processing method according to claim 2, wherein the one or more representative colors include at least one of red, green, blue, cyan, magenta, and yellow.

4. The color processing method according to claim 1, further comprising setting the representative colors in response to a user's instruction.

5. The color processing method according to claim 1, wherein setting the reference lightness range includes, when two or more reference colors are set, setting the reference lightness range to a lightness range between a value equal to or lower than a lightness value of a reference color having the highest lightness among the reference colors and a value equal to or higher than a lightness value of a reference color having the lowest lightness among the reference colors, and, when one reference color is set, setting the reference lightness range to a lightness value of the one reference color.

6. The color processing method according to claim 1, wherein mapping the one or more input colors into the second color gamut includes:

setting an internal dividing point at which a line connecting a point indicated by the input color and the mapped point is internally divided at a predetermined ratio;

if a saturation value of the input color is higher than a saturation value of the internal dividing point, mapping the input color; and if the saturation value of the input color is equal to or lower than the saturation value of the internal dividing point, not mapping the input color.

7. A computer-readable medium having stored thereon computer-executable instructions for a color processing apparatus to perform a color processing method of mapping one or more input colors in a first color gamut into a second color gamut, the color processing method comprising:

determining representative colors based on the input color;

setting a reference lightness range based on lightness of the determined representative colors and a hue of the input color in the first color gamut;

setting a first distribution range for a mapped point based on maximum lightness of the second color gamut and an upper point of the reference lightness range, a second distribution range for the mapped point based on the reference lightness range, and a third distribution range for the mapped point based on minimum lightness of the second color gamut and a lower point of the reference lightness range;

setting the mapped point based on the lightness of the input color and each of the set distribution ranges; and mapping the input color in the second color gamut using a line connecting the mapped point and the input color, wherein, when the lightness of the input color is higher than the upper point, the mapped point is distributed in the first distribution range, when the lightness of the input color is inside the reference lightness range, the mapped point is distributed in the second distribution range such that the input color to be mapped is distributed in the second distribution range such that the input color to be mapped is mapped with lightness kept constant, and when the lightness of the input color is lower than the lower point, the mapped point is distributed in the third distribution range.

8. A color processing apparatus configured to map one or more input colors in a first color gamut into a second color gamut, the color processing apparatus comprising:

a determining unit arranged to determine representative colors based on the input color;

a first setting unit arranged to set a reference lightness range based on lightness of the determined representative colors and a hue of the input color in the first color gamut;

a second setting unit arranged to set a first distribution range for a mapped point based on maximum lightness of the second color gamut and an upper point of the reference lightness range, a second distribution range for the mapped point based on the reference lightness range, and a third distribution range for the mapped point based on minimum lightness of the second color gamut and a lower point of the reference lightness range;

a third setting unit arranged to set the mapped point based on the lightness of the input color and each of the set distribution ranges; and a mapping unit arranged to map the input color in the second color gamut using a line connecting the mapped point and the input color, wherein, when the lightness of the input color is higher than the upper point, the mapped point is distributed in the first distribution range, when the lightness of the input color is inside the reference lightness range, the mapped point is distributed in the second distribution range such that the input color to be mapped is distributed in the second distribution range such that the input color to be mapped is mapped with lightness kept constant, and when the lightness of the input color is lower than the lower point, the mapped point is distributed in the third distribution range.

* * * * *